Oct. 25, 1966
M. RUBIN
3,280,488
IDENTIFICATION COAT FLAPS
Filed April 23, 1964
3 Sheets-Sheet 1
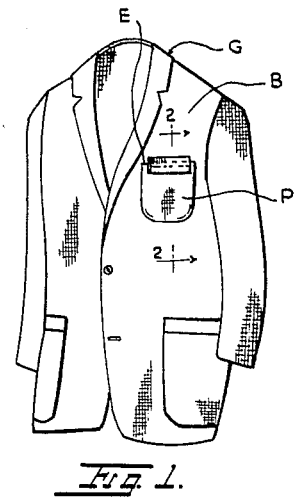
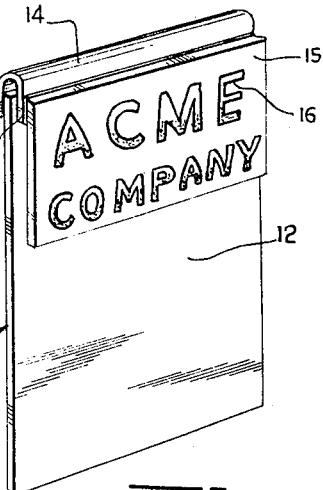
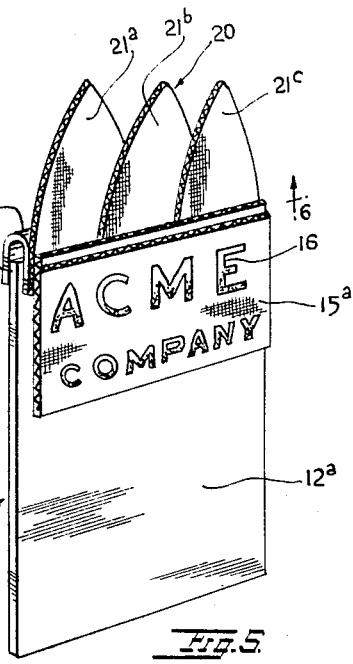
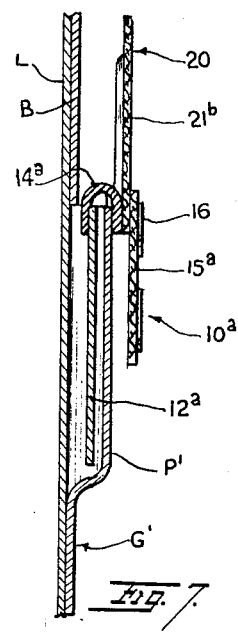
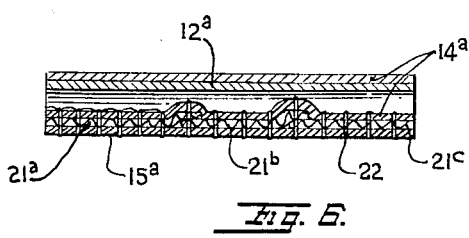
INVENTOR.
Michael Rubin
BY Polachek & Saulsbury
ATTORNEYS Oct. 25, 1966 M. RUBIN 3,280,488
IDENTIFICATION COAT FLAPS
Filed April 23, 1964 3 Sheets-Sheet 2
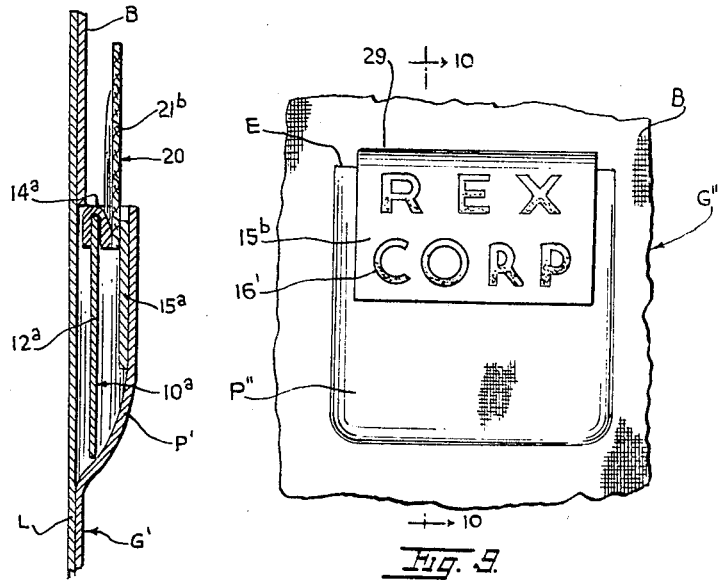
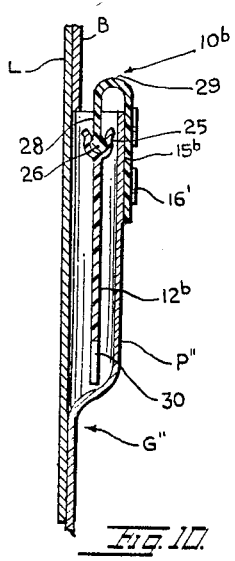
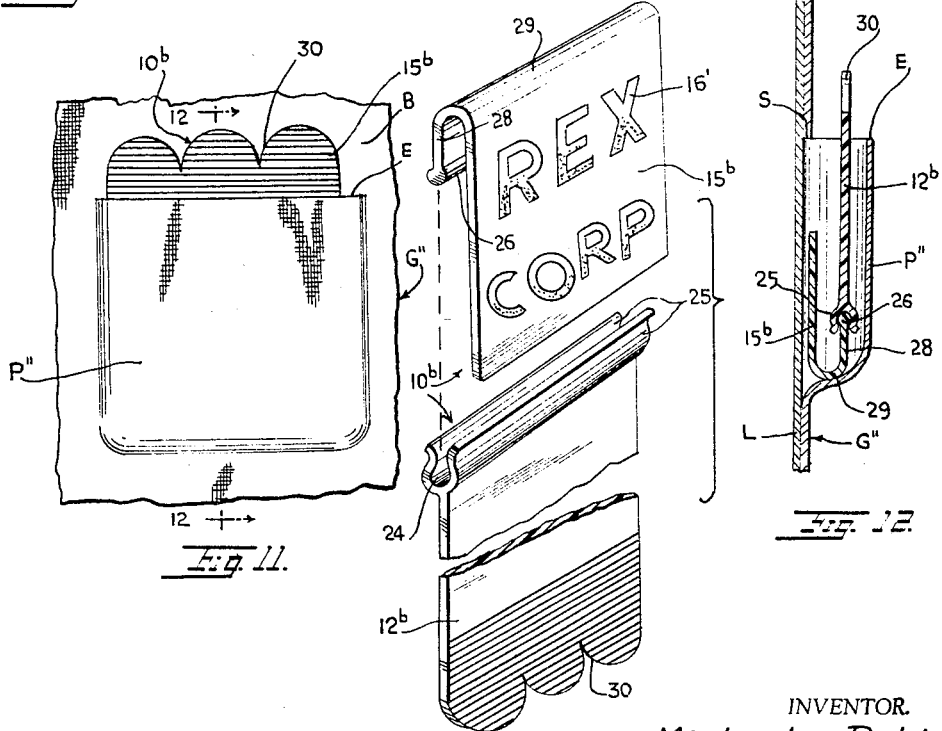
INVENTOR.
Michael Rubin
BY Polachek & Saulsbury
ATTORNEYS.

Oct. 25, 1966　　　　　M. RUBIN　　　　　3,280,488
IDENTIFICATION COAT FLAPS
Filed April 23, 1964　　　　　　　　　　3 Sheets-Sheet 3

INVENTOR.
Michael Rubin
BY Polachek & Saulsbury
ATTORNEYS.

United States Patent Office 3,280,488
Patented Oct. 25, 1966

3,280,488
IDENTIFICATION COAT FLAPS
Michael Rubin, 166—25 Powells Cove Blvd.,
Beechhurst, Long Island, N.Y.
Filed Apr. 23, 1964, Ser. No. 362,020
1 Claim. (Cl. 40—1.5)

This invention concerns an identification device which may be worn on a garment pocket.

According to the invention, there is provided an identification device which servicemen may wear on the pocket of a coat, jacket or shirt to identify their organization or service, while they are on duty. The device is arranged so that it can be tucked inside the pocket to hide the identification when the serviceman is off duty. The device may have a removable and interchangeable nameplate. In another form of the invention there is a simulated handkerchief structure associated with the nameplate. This form of the device is especially intended for use by company representatives at conventions. In this form of device the nameplate of the organization can also be concealed when required.

It is therefore one object of the invention to provide a device wearable on a pocket of a garment for identification purposes.

Another object is to provide an identification device including a base member and a nameplate attached together by a hinge member for wearing of the nameplate inside or outside of a garment pocket.

A further object is to provide a device as described wherein the nameplate is removable from the base plate.

Another object is to provide a device as described with a decorative simulated handkerchief structure thereon.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a front view of a coat with an identification device embodying the invention worn on a pocket of the coat.

FIG. 2 is a sectional view on an enlarged scale taken on line 2—2 of FIG. 1.

FIG. 3 is an enlarged perspective view of an identification device.

FIG. 4 is a sectional view similar to FIG. 2, with the nameplate of the device tucked inside the pocket.

FIG. 5 is a perspective view of another identification device embodying the invention.

FIG. 6 is an enlarged sectional view taken on line 6—6 of FIG. 5.

FIG. 7 is a sectional view similar to FIG. 2, showing the device of FIG. 5 worn in a pocket of a coat, with nameplate exposed.

FIG. 8 is a sectional view similar to FIG. 7, with nameplate concealed inside the pocket.

FIG. 9 is a front elevational view of part of a coat showing part of another identification device.

FIG. 10 is a sectional view taken on line 10—10 of FIG. 9.

FIG. 11 is a front view of part of a coat showing the device of FIGS. 9 and 10 worn in an inverted position.

FIG. 12 is a sectional view taken on line 12—12 of FIG. 11.

FIG. 13 is an exploded perspective view of parts of the device of FIGS. 9–12, a portion being broken away.

Figure 14:
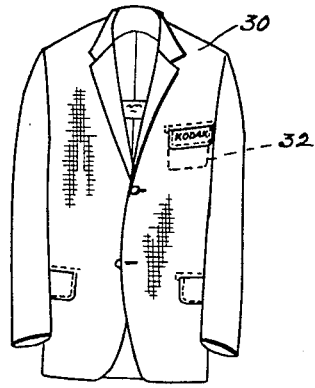
FIG. 14 is a view similar to FIG. 1 of a coat with an identification device embodying still another modified form of the invention.

Referring first to FIGS. 1–4 there is shown a device 10 including a rectangular base plate 12 made of metal, plastic or other rigid material. At the upper edge of the plate is secured by adhesive 11 or other suitable means of flexible hinge member 14. This member may be made of sheet plastic, cloth or other suitable flexible material. Secured by adhesive 19 or other suitable means to the outer edge of this hinge member is a rectangular flap 15 which serves as a nameplate. On this flap, if it is made of cloth, may be embroidered the name of a company or organization or other identification 16. Instead of being embroidered, the identification can be printed or engraved if the flap or nameplate 15 is made of metal or plastic material.

A slit S can be made in the body B of a garment G to define a pocket P. The lining L of the garment may serve as a back for the pocket. Alternatively, the pocket can be of patch type sewn to the body of the garment, which may be a coat, blouse, jacket, shirt or the like. In any case, the base plate 12 can be inserted through the slit S and disposed behind the pocket P as clearly shown in FIGS. 2 and 4. The nameplate 15 can be located outside the pocket as shown in FIGS. 1 and 2 with the hinge member overlaying the upper edge E of the pocket, so that the identification 16 is exposed. FIG. 4 shows that the nameplate can be tucked inside the pocket for concealing the identification when desired.

FIGS. 5–8 show identification device 10a which is similar to device 10, with base plate 12a, nameplate 15a and flexible hinge member 14a. A simulated handkerchief 20 is made by overlapping three tapered flat members 21a–21c made of white or colored cloth. The wider ends of the members 21a–21c are secured to hinge member 14a by stitching 22, along with the upper edge of nameplate 15a.

FIG. 7 shows both the simulated handkerchief 20 and nameplate 15a exposed in front of the garment G' and garment pocket P'. The nameplate depends from the lower edge of the handkerchief 20 which extends decoratively above the nameplate. FIG. 8 shows the simulated handkerchief 20 still exposed, but the nameplate 15a is concealed inside the pocket. The base plate 12a supports the handkerchief 20 and nameplate 15a in vertical positions inside and outside the pocket.

FIGS. 9–13 show another identification device 10b in which the base plate 12b has a generally cylindrical groove 24 defined by a pair of outwardly flaring flexible flanges 25 at the upper end of the plate. A cylindrical ridge 26 formed at the lower end of a flange 28 snaps into and out of groove 24. Flange 28 is integral with the nameplate 15b and is bent rearwardly thereof to define an upper grooved flexible hinge portion 29.

FIGS. 9 and 10 show the nameplate 15b suspended and exposed outside of pocket P" of garment G". The base plate 12b is disposed inside the pocket and the identification marking 16' is clearly exposed.

The lower end of the base plate is formed with scallops or serrations 30 to simulate a folded or fancy handkerchief. This scalloped end of the base plate may be colored as indicated in the drawing. FIGS. 11 and 12 show the device worn in an inverted position in pocket P" with the nameplate 15b concealed and with the scalloped end 30 of the base plate exposed in a decorative manner.

FIG. 13 shows the separable construction of the parts 12b and 15b so that different nameplates can be interchangeably attached to the base plate 12b.

Figure 15:
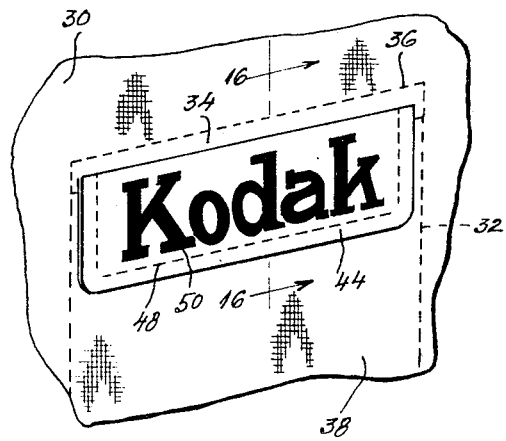
FIG. 15 is an enlarged fragmentary perspective view showing the identification device of FIG. 14.
Figures 16, 18:
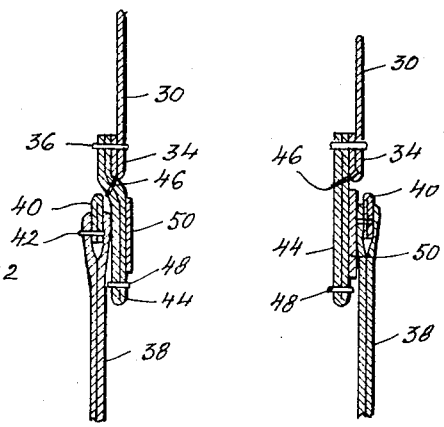
FIG. 16 is a vertical sectional view taken on the line 16—16 of FIG. 15.
FIG. 18 is a vertical sectional view taken on the line 18—18 of FIG. 17.

Referring now to the form of the invention shown in FIGS. 14 to 18, inclusive, herein there is shown a fabric coat 30 of the blazer type with patch pocket 32 open at the top. Above the open top of the pocket piping 34 is formed by a row of stitching 36. On the top of the front panel 38 of the pocket, piping 40 is also secured by a row of stitching 42. The piping 40 is shown slightly spaced laterally of the plane of the piping 34 to the left as shown in FIG. 16. A rectangular flap 44 of two-ply material is hingedly secured to the top piping 34 by row of stitching 36 and by a slanting row of stitching 46. The free edge of the flap is finished off by a row of stitching 48.

The flap 44 serves as a nameplate. On this flap, there is embroidered the name of a company or organization such as "Kodak" or other identification as indicated at 50.

Figure 17:
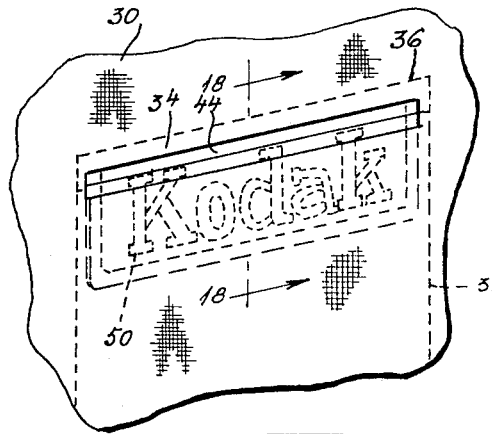
FIG. 17 is a view similar to FIG. 15 with the identification device shown tucked inside the pocket.

The flap or nameplate 44 is normally disposed outside of the pocket as shown in FIGS. 14, 15 and 16. However, the flap or nameplate can be tucked inside the front panel 38 of the pocket for concealing the identification when desired as shown in FIGS. 17 and 18.

In all forms of the invention described, the nameplate can be worn inside or outside the pocket. The nameplate and base plate may be made of metal, plastic, cloth or other suitable materials.

If desired, the nameplate 15 shown in FIG. 3 can be made removable from base plate 12 for interchanging with other nameplates. The nameplate can be removably attached by pressure sensitive adhesive applied at its upper rear edge. Other suitable quick detachable means such as snap fasteners, slide fasteners, and the like may be used instead.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

An identification device for a garment pocket having an open top and a horizontal upper edge, comprising a base plate having a width substantially equal to that of the pocket for retention inside the pocket in non-rotatable vertical position, said base plate having one edge shaped to simulate a handerchief, flexible joint means at the other edge of the base plate, a nameplate carrying identification indicia, and hinge means connected to the nameplate, said hinge means having a joint member detachably engaged with said joint means of the base plate, whereby the nameplate is suspended outside the pocket to display the indicia and the hinge means overlays the upper edge of the pocket while the base plate is inside the pocket with said one edge thereof concealed in the pocket, and whereby the nameplate and hinge means are concealed inside the pocket when the nameplate is inverted in the pocket to expose the simulated handkerchief.

References Cited by the Examiner

UNITED STATES PATENTS

| 2,285,670 | 6/1942 | Logsdon | 40—1.5 |
| 2,513,154 | 6/1950 | Dundon | 2—279 |
| 2,746,058 | 5/1956 | Greer | 2—249 |

FOREIGN PATENTS

| 11,644 | 5/1913 | Great Britain. | |

EUGENE R. CAPOZIO, *Primary Examiner.*

W. J. CONTRERAS, *Assistant Examiner.*